(12) United States Patent
Brock (10) Patent No.: US 11,988,198 B1
(45) Date of Patent: May 21, 2024

(54) SYSTEM AND METHOD OF HYDRAULIC GRAVITATIONAL ENERGY GENERATION

(71) Applicant: Owen W. Brock, Raleigh, NC (US)

(72) Inventor: Owen W. Brock, Raleigh, NC (US)

(*) Notice: Subject to any disclaimer, the term of this patent is extended or adjusted under 35 U.S.C. 154(b) by 0 days.

(21) Appl. No.: 18/226,350

(22) Filed: Jul. 26, 2023

Related U.S. Application Data (60) Provisional application No. 63/396,408, filed on Aug. 9, 2022.

(51) Int. Cl.
| | |
|---|---|
| F03G 3/00 | (2006.01) |
| F03B 17/00 | (2006.01) |
| F03G 7/10 | (2006.01) |
| F03B 17/02 | (2006.01) |

(52) U.S. Cl.
CPC .............. *F03G 3/094* (2021.08); *F03B 17/00* (2013.01); *F03G 7/10* (2013.01); *F03G 7/104* (2021.08); *F03B 17/005* (2013.01); *F03B 17/025* (2013.01)

(58) Field of Classification Search
CPC . F03G 3/094; F03G 7/10; F03G 7/104; F03B 17/00; F03B 17/005; F03B 17/025
See application file for complete search history.

(56) References Cited

U.S. PATENT DOCUMENTS

| | | | | | |
|---|---|---|---|---|---|
| 483,645 | A | * | 10/1892 | Drake | B66D 5/00 185/31 |
| 1,606,932 | A | * | 11/1926 | Foster | F03B 17/02 60/503 |
| 3,536,929 | A | * | 10/1970 | Parker | F03B 13/00 290/1 R |
| 6,803,670 | B2 | * | 10/2004 | Peloquin | F03B 17/025 60/497 |
| 8,360,205 | B1 | * | 1/2013 | M noz | F03B 17/025 185/32 |
| 8,872,367 | B2 | * | 10/2014 | Moltion | H02K 53/00 290/1 D |
| 9,903,391 | B2 | * | 2/2018 | Heindl | E21D 9/006 |
| 10,138,875 | B2 | * | 11/2018 | Kellinger | F03B 13/10 |
| 10,233,897 | B2 | * | 3/2019 | Stenzel | F15B 1/045 |
| 10,833,533 | B2 | * | 11/2020 | Soloboev | B60L 55/00 |
| 2012/0280515 | A1 | * | 11/2012 | Huang | F03B 13/06 290/52 |
| 2014/0049051 | A1 | * | 2/2014 | Burke | F03G 7/08 290/1 R |

* cited by examiner

*Primary Examiner* — Dustin T Nguyen
(74) *Attorney, Agent, or Firm* — Ashley D. Johnson; Dogwood Patent and Trademark Law (57) ABSTRACT

The invention is a system and method of generating hydraulic gravitational energy. Specifically, traditional gravitational electricity systems use a weight as a battery. However, the weight must be pulled upwards after it is dropped, which expends the created energy. In contrast, the disclosed arrangement employs a hydraulic system to lift the weight from a lower height to an upper height. Notably, hydraulics create more energy than is exerted. Thus, using hydraulics to lift the weight multiplies the energy produced each time the weight is dropped from a first height to a second, lower height. As a result, gravitational solutions can extend beyond non-traditional batteries, and can be used to generate electricity instead.

20 Claims, 14 Drawing Sheets

SYSTEM AND METHOD OF HYDRAULIC GRAVITATIONAL ENERGY GENERATION

CROSS-REFERENCE TO RELATED APPLICATIONS

This application claims priority to U.S. Provisional Patent Application No. 63/396,408, filed Aug. 9, 2022, the entire content of which is hereby incorporated by reference.

TECHNICAL FIELD

The presently disclosed subject matter is generally directed to a system and method of generating hydraulic gravitational energy.

BACKGROUND

Fossil fuel-based energy sources have been extensively used for many years. Specifically, coal, crude oil, and natural gas can be burned to provide heat, to power engines, and to generate electricity. However, because the reserves of fossil fuels are finite and have negative environmental impacts for humans, plant life, and animals, there has been significant interest in alternative energy sources. For example, solar panels use sunlight as a source of energy to generate direct current electricity. Nonetheless, solar power produces electricity only when the sun is available, and the current designs require large areas of land for the solar panels. Wind generation has also been explored as a renewable energy resource. However, wind generation requires specific areas of wind turbulence and large, expensive propeller-driven machines to generate power. Further, the wind propellers require frequent and costly maintenance, as well as large areas of land or expensive ocean-type support structures. It would therefore be beneficial to provide alternate methods of generating energy that overcome the disadvantages discussed above.

SUMMARY

The presently disclosed subject matter is directed to a system comprising a main weight comprising one or more arms that extend outwardly from a front face, rear face, side face, or combinations thereof. The system also includes a hydraulic cylinder comprising an upper first end, a lower second end, a length between the upper and lower ends, and a diameter configured to accommodate a hydraulic piston configured to travel along an interior of the hydraulic cylinder. The hydraulic cylinder contacts one end of each arm and wherein the hydraulic piston is configured to raise the main weight from the lower second end of the hydraulic cylinder to the upper first end of the hydraulic cylinder. The system includes a pair of cables, each comprising a first end attached to the main weight, wherein each cable includes a toothed region that cooperates with a spool that includes an electromagnet positioned at each end. The system comprises a pair of rotatable catching rods with one end positioned adjacent to the main weight, and a pair of upper wheels and a pair of lower wheels, wherein the catching rods support the main weight in a first position and in a second position release the main weight.

In some embodiments, the main weight has a weight of about 400-700 pounds.

In some embodiments, the main weight is constructed from copper, iron, stainless steel, cement, lead, or combinations thereof.

In some embodiments, the hydraulic cylinder having a height (e.g., from a lowest vertical point to a highest vertical point) of about 10 to 30 feet (e.g., at least/no more than about 10, 15, 20, 25, or 30 feet). It should be appreciated that the height can be greater or less than the given range.

In some embodiments, the hydraulic cylinder is approximately vertical in orientation.

In some embodiments, the system includes a tension weight positioned at the second end of each cable. In some embodiments, the system includes a spring ceiling in communication with the tension weight, the spring ceiling defined by a platform and a plurality of springs.

In some embodiments, the system includes a motor defined by a series of poles that move the catching rods.

In some embodiments, the catching rod is supported by a table.

In some embodiments, the catching rod comprises a plurality of counterweights.

In some embodiments, the counterweights are on an opposing end of the catching rod from the main weight.

In some embodiments, the counterweights have a weight of about 50-300 pounds each.

In some embodiments, the catching rod is configured to rotate about 90 degrees.

In some embodiments, the hydraulic cylinder includes an exterior polyurethane foam covering.

In some embodiments, the hydraulic cylinder is activated by an electric water pump.

In some embodiments, the tension weight has a weight of about 10-150 pounds.

In some embodiments, the presently disclosed subject matter is directed to a method of generating gravitational energy. Specifically, the method comprises dropping the main weight of the disclosed system from the upper first end of the hydraulic cylinder to the lower second end, generating gravitational energy. The hydraulic cylinder allows for energy gain because it is able to multiply an applied force. As a result, more energy is produced from the main weight dropping compared to the amount of energy required to lift the weight up to the upper first end of the hydraulic cylinder. The actual energy generated is considered gravitational energy. The method includes initiating the hydraulic cylinder piston to push the main weight from the lower second end of the hydraulic cylinder to the upper first end of the hydraulic cylinder. The electric generators are powered by dropping the main weight to generate gravitational energy.

In some embodiments, the presently disclosed subject matter is directed to a method of generating gravitational energy. Particularly, the method comprises dropping the main weight of the disclosed system from the upper first end of the hydraulic cylinder to the lower second end to generate energy; initiating the hydraulic cylinder piston to push the main weight from the lower second end of the hydraulic cylinder to the upper first end of the hydraulic cylinder; wherein the electric generators are powered by dropping the main weight; and wherein gravitational energy is generated. The term "gravitational energy" refers to the potential energy an object has because of its higher position compared to a lower position (e.g., if it is closer or farther away from the ground). Gravitational energy therefore is the potential energy associated with the gravitational field that is released (converted to kinetic energy) when the object falls toward the ground.

In some embodiments, the main weight is dropped a distance of about 10-30 feet (e.g., at least/no more than about 10, 15, 20, 25, or 30 feet). In some embodiments, the distance can be greater or less than the noted range.

DETAILED DESCRIPTION

The presently disclosed subject matter is introduced with sufficient details to provide an understanding of one or more particular embodiments of broader inventive subject matters. The descriptions expound upon and exemplify features of those embodiments without limiting the inventive subject matters to the explicitly described embodiments and features. Considerations in view of these descriptions will likely give rise to additional and similar embodiments and features without departing from the scope of the presently disclosed subject matter.

Unless defined otherwise, all technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Following long-standing patent law convention, the terms "a", "an", and "the" refer to "one or more" when used in the subject specification, including the claims. Thus, for example, reference to "a device" can include a plurality of such devices, and so forth. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise indicated, all numbers expressing quantities of components, conditions, and so forth used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, and/or percentage can encompass variations of, in some embodiments+/−20%, in some embodiments+/−10%, in some embodiments+/−5%, in some embodiments+/−1%, in some embodiments+/−0.5%, and in some embodiments+/−0.1%, from the specified amount, as such variations are appropriate in the disclosed packages and methods.

As used herein, the term "and/or" includes any and all combinations of one or more of the associated listed items.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The presently disclosed subject matter is directed to a system and method of generating hydraulic gravitational energy. Specifically, traditional gravitational electricity systems use a weight as a battery. However, the weight must be pulled upwards after it is dropped, which expends the created energy. In contrast, the presently disclosed arrangement employs a hydraulic system to lift the weight from a lower height to an upper height. Notably, hydraulics create more energy than is exerted. Thus, using hydraulics to lift the weight multiplies the energy produced each time the weight is dropped from a first height to a second, lower height. As a result, gravitational solutions can extend beyond non-traditional batteries, and can be used to generate electricity instead.

Figure 1:
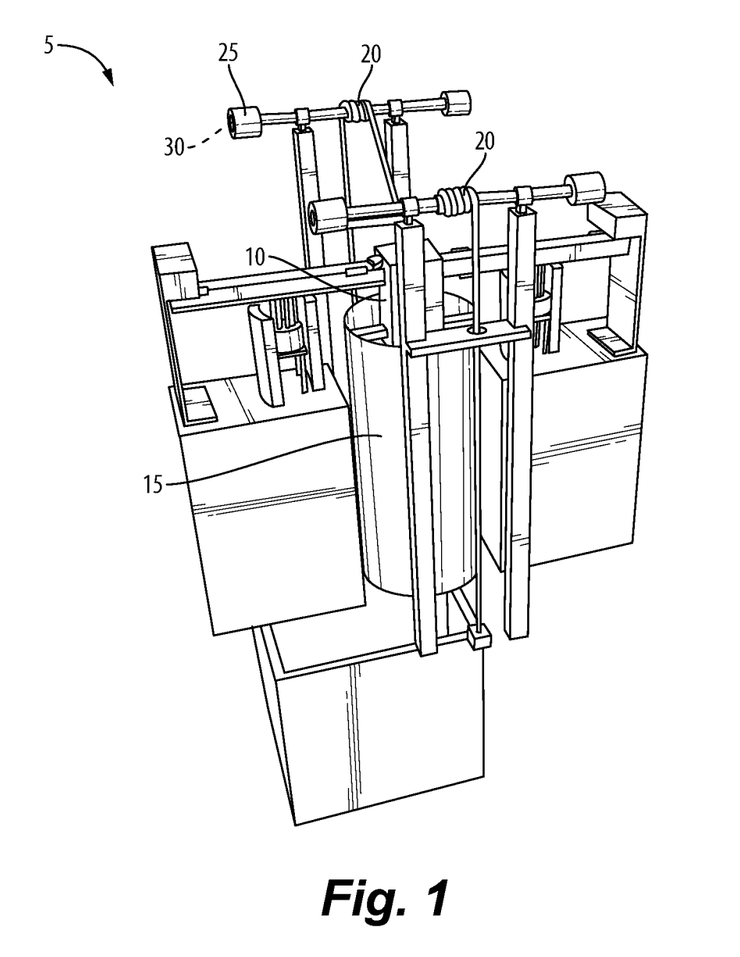
FIG. 1 is a perspective view of a system comprising a weight that travels up and down the interior of a hydraulic cylinder in accordance with some embodiments of the presently disclosed subject matter.

As illustrated in FIG. 1 and described in more detail below, system 5 includes one or more weights 10 that are raised and lowered onto a hydraulic piston positioned within gravitational hydraulic cylinder 15. The hydraulic piston lifts the main weight to a raised position when hydraulic pressure is applied to the lower side of the piston. While the weight is in motion from the top of the hydraulic cylinder to the bottom of the cylinder, a pair of toothed cables 20 is in communication are attached at a top end of weight 10. As the weight drops to the lower end of the hydraulic cylinder, the cables are pulled downward with the weight, spinning spools 25, creating electricity in one or more generators 30. In this way, the generator converts mechanical energy from dropping weight 10 into electric power.

Figure 2:
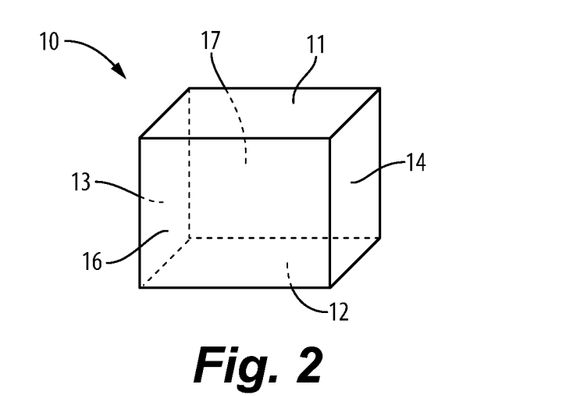
FIG. 2 is a perspective view of a weight in accordance with some embodiments of the presently disclosed subject matter.

FIG. 2 illustrates one embodiment of main weight 10. The term "weight" refers to a mass with a predetermined weight value. Weight 10 can have any desired weight, such as about 200-900 pounds. Thus, weight 10 can have a weight of at least about (or no 200, 250, 300, 350, 400, 450, 500, 550, 600, 650, 700, 750, 800, 850 or 900 pounds). However, it should be appreciated that weight 10 can have a weight that is more or less than the range given above. In some embodiments, the disclosed system can include a variety of weights that can be selected depending on the energy requirements at a particular location, time of day, etc.

Weight 10 can be constructed from any suitable material, such as (but not limited to) metal or other heavy materials. Thus, the weight can comprise copper, iron, stainless steel, cement, lead, or combinations thereof. Similarly, the weight can be configured in any desired shape (e.g., with a circular, oval, square, rectangular, etc. cross-sectional shape). For example, in the embodiment of FIG. 2, the weight includes top face 11 and opposed bottom face 12, left and right edges 13 and 14, and front and rear faces 16 and 17. It should be appreciated that weight 10 is not limited to the shape of FIG. 2.

Figure 3A:
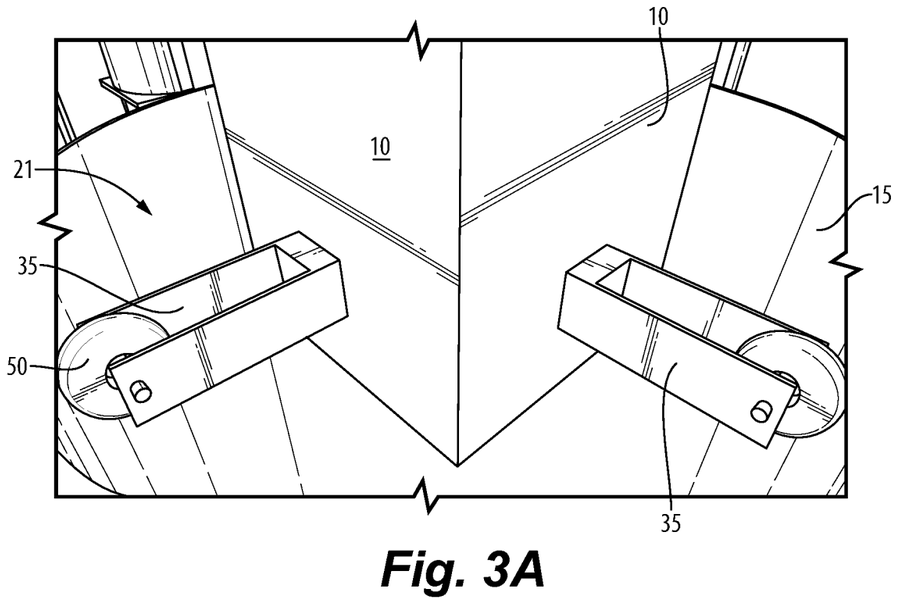
FIGS. 3a-3c are perspective views of weight arms in accordance with some embodiments of the presently disclosed subject matter.
Figure 3B:
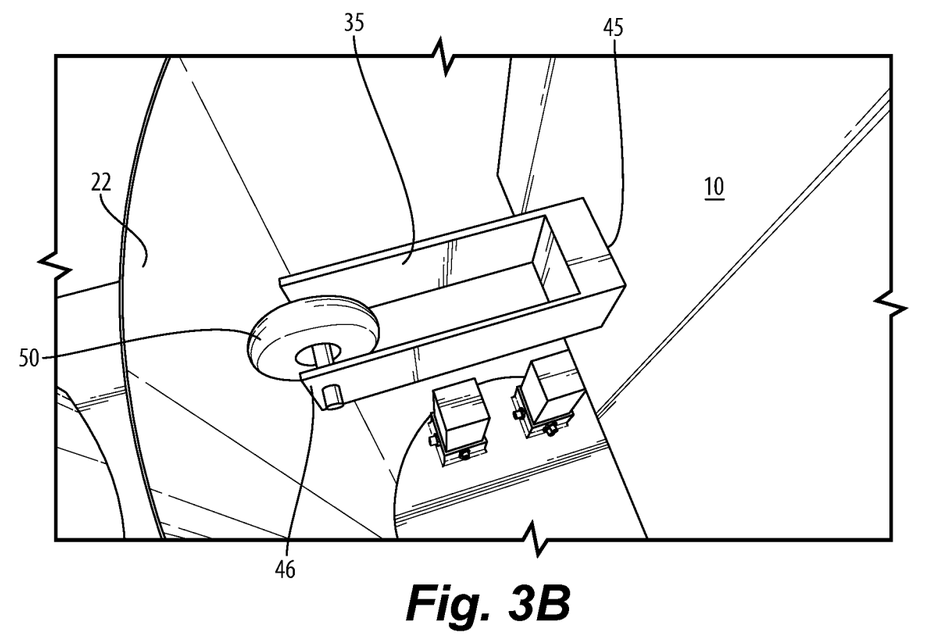
Figure 3C:
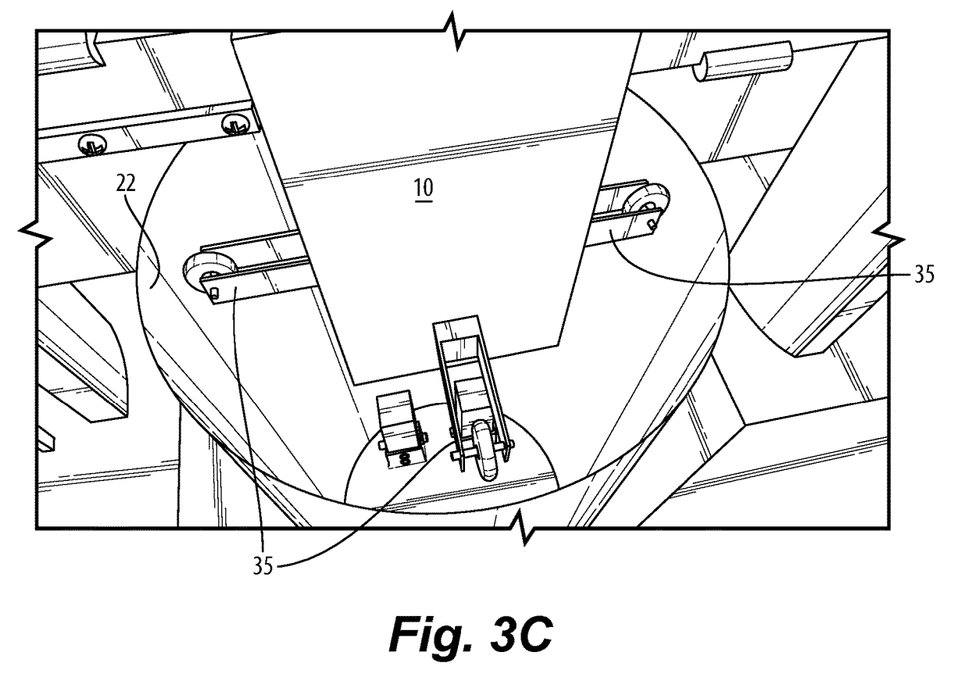

As noted above, weight 10 is dropped within interior 21 of hydraulic cylinder 15 to generate electric power. In some embodiments, weight 10 can include one or more arms 35 that contact interior sidewall 22 of the hydraulic cylinder, as shown in FIGS. 3a and 3b. In this way, the weight smoothly and consistently can be raised and lowered the height of the hydraulic cylinder. Each arm includes first end 45 attached to one surface of weight 10 and second end 46 that includes a wheel that directly contacts cylinder an interior surface of sidewall 22. Wheel 50 allows the weight to easily travel between the cylinder upper and lower ends (e.g., the wheel can be rolled along interior sidewall 22). The weight can include any number of arms, such as between 2-10 or more. In some embodiments, each face of the weight can include at least one arm, as shown in FIG. 3c. Thus, the weight left, right, front, and rear surfaces can include at least one arm. The arms function to keep weight 10 centered while falling.

Figure 4A:
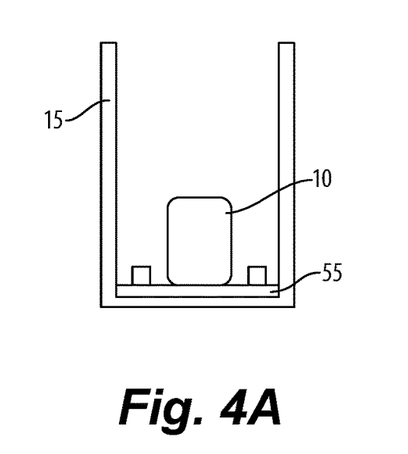
FIGS. 4a-4c are side plan view of a hydraulic cylinder comprising a piston that raises and lowers a weight in accordance with some embodiments of the presently disclosed subject matter.
Figure 4B:
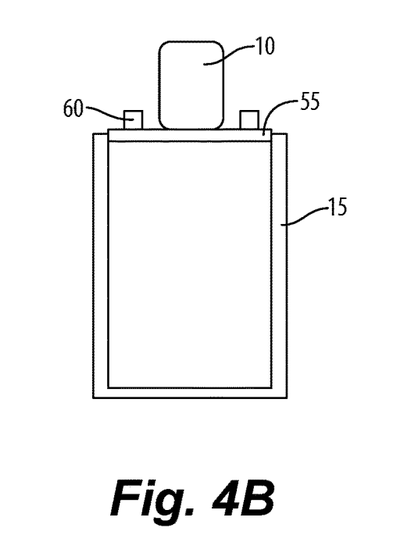
Figure 4C:
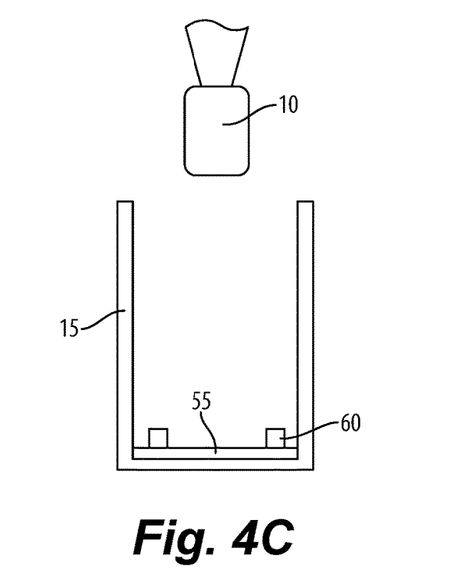

Hydraulic cylinder 15 is positioned vertically within the system, as shown. The term "hydraulic cylinder" refers to a hydraulic piston-cylinder device having any suitable structure. The hydraulic cylinder functions as a mechanical actuator that provides a unidirectional force through a unidirectional stroke. In some embodiments, the hydraulic cylinder is a gravitational hydraulic cylinder (e.g., vertically positioned). The term "gravitational hydraulic cylinder" refers to a cylinder that extends to lift a weight against the force of gravity by applying oil pressure at piston end 55, as shown in FIGS. 4a and 4b. Hydraulic pressure is therefore used to lift weight 10 to the initial raised elevation at the top of the hydraulic cylinder to reset the system. Thus, in use the system begins with an arrangement as set forth in FIG. 4c with the main weight positioned at an upper height. The system then proceeds as set forth in FIG. 4a, as the weight is dropped by gravity and is then reset using hydraulic forces as shown in FIG. 4b.

Figure 5A:
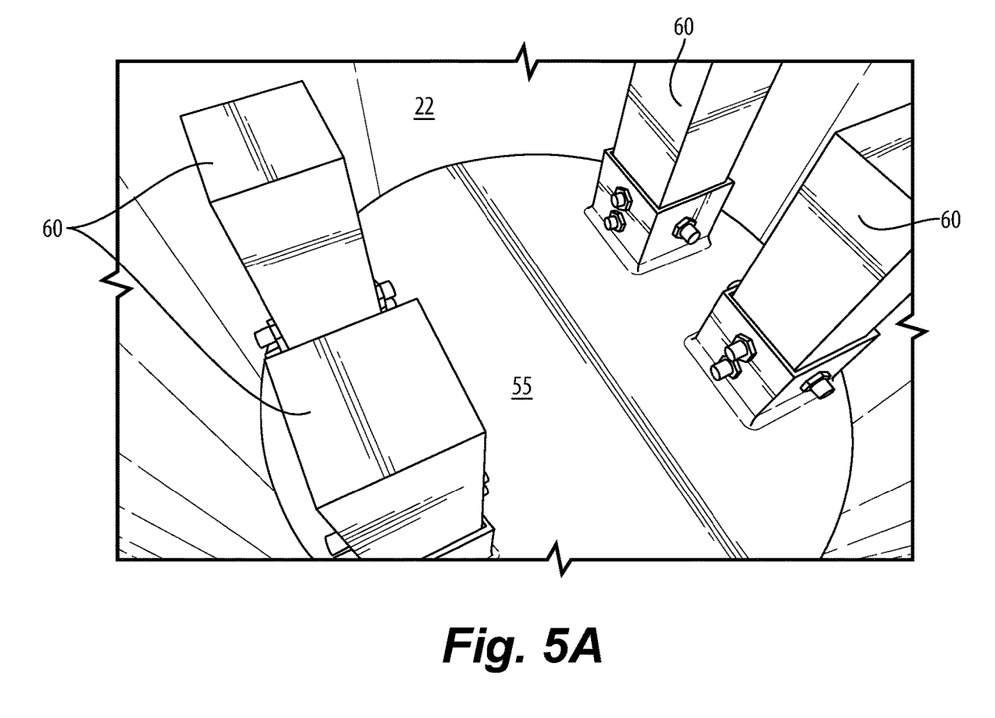
FIG. 5a is a perspective view of the top face of a cylinder piston end comprising a plurality of gravity weights in accordance with some embodiments of the presently disclosed subject matter.
Figure 5B:
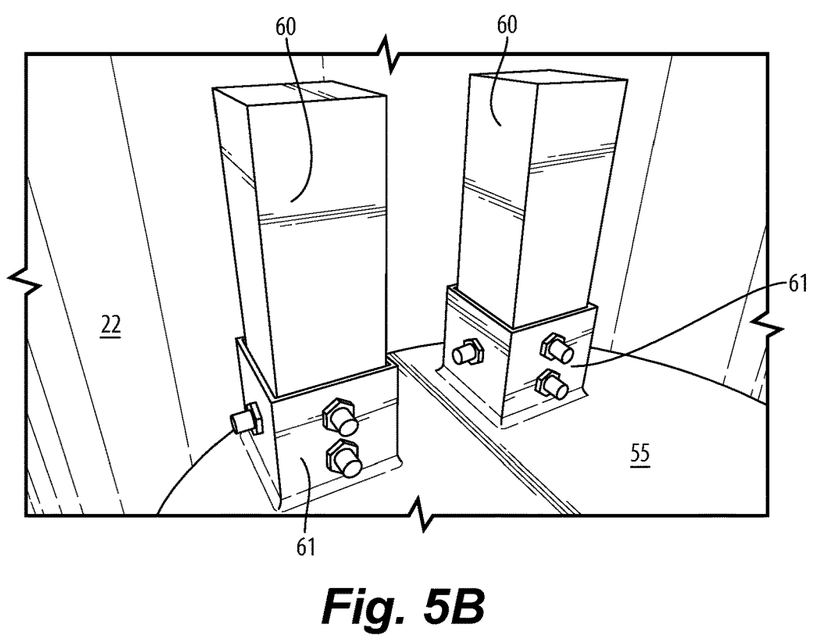
FIG. 5b is a perspective view of a plurality of gravity weights in accordance with some embodiments of the presently disclosed subject matter.

The hydraulic cylinder can include one or more gravity weights 60 that facilitate lowering of piston end 55, as shown in FIGS. 5a and 5b. Each gravity weight can have a weight of about 75 pounds (e.g., at least/no more than about 50, 55, 60, 65, 70, 75, 80, 85, 90, 95, or 100 pounds). The gravity weights can be positioned at an outer circumference of the piston end (e.g., adjacent to cylinder inner sidewall 22) to ensure they do not interfere with main weight 10 when dropped onto the end piston.

Each gravity weight can be positioned within housing 61 in some embodiments. Any method can be used to retain the gravity weights in the housing, such as the use of mechanical closures (e.g., bolts, screws, and the like).

In some embodiments, the hydraulic cylinder can be wrapped in an insulating material, such as polyurethane foam or microfiber glass to provide insulative characteristics (e.g., during cold temperatures). Any insulative material can be used, such as (but not limited to) polyurethane foam, expanded perlite foam, expanded polystyrene foam, cork, wood, mineral fibers, fiberglass, cellulose, metal foil, fabric, and the like.

Figure 6A:
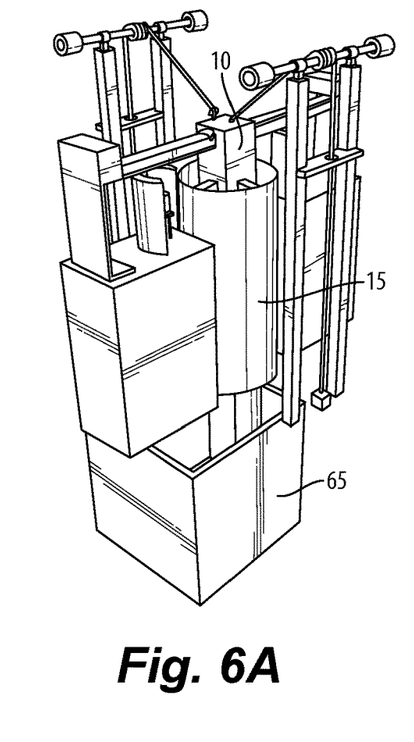
FIG. 6a is a perspective view of a system in accordance with some embodiments of the presently disclosed subject matter.
Figure 6B:
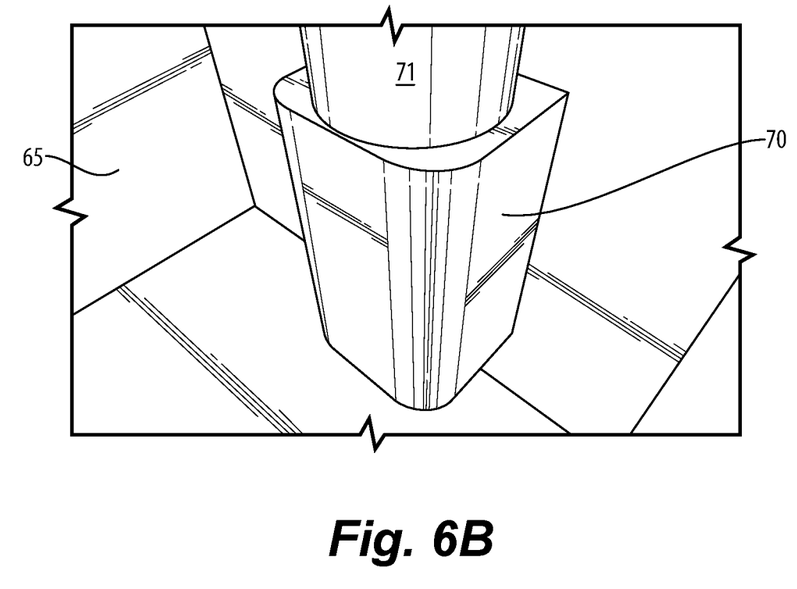
FIG. 6b is a perspective view of the interior of a tank comprising a water pump in accordance with some embodiments of the presently disclosed subject matter.
Figure 6C:
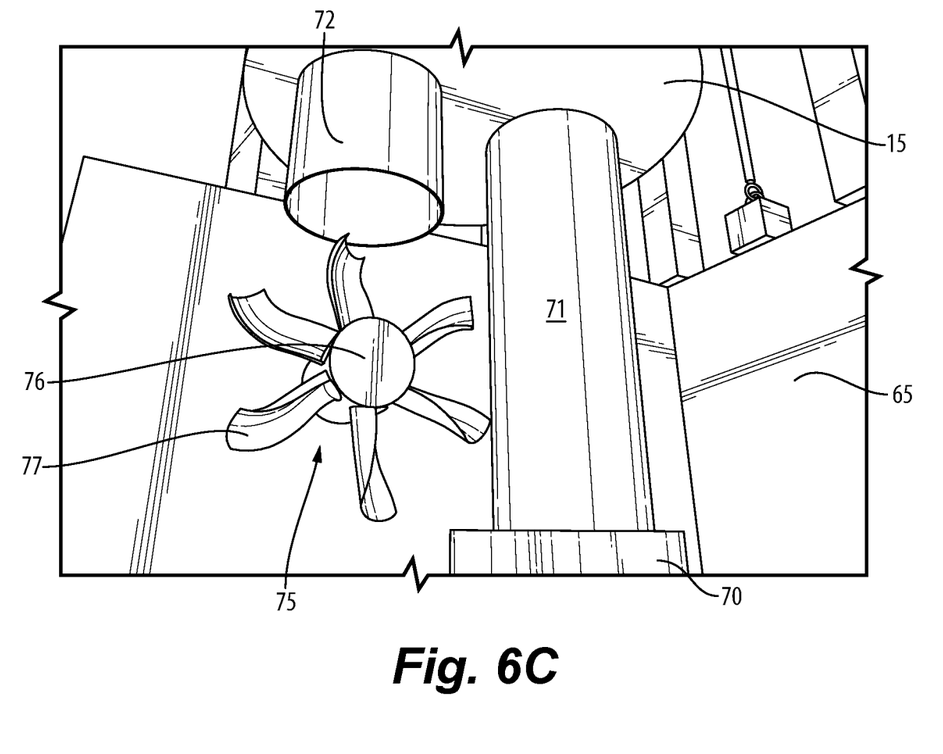
FIG. 6c is a perspective view of the interior of a tank comprising an intake valve, a release valve, and a turbine in accordance with some embodiments of the presently disclosed subject matter.

Hydraulic cylinder 15 is positioned above tank 65, as shown in FIG. 6a. The tank can be configured with an open top end and a closed bottom and side ends that join to form an interior space. As shown in FIGS. 6b and 6c, the interior of the tank can include water pump 70 in communication with the hydraulic cylinder through intake valve 71. The term "water pump" refers to any element that has the ability to move water from a source across a distance or elevation. In the disclosed system, the electric water pump is used to move biodegradable hydraulic oil to raise and/or lower end piston 55. Release valve 72 is also configured on a lower surface of the hydraulic cylinder. The intake valve allows hydraulic oil to enter the pump and then traps it by closing. The release valve releases the high pressure fluid stream. Thus, in use, the lower end piston of the hydraulic cylinder is raised and lowered by a pumping action of the water pump.

Turbine 75 is positioned under the release valve to capture lost energy when the release valve is activated. For example, the turbine can spin to capture energy. The term "turbine" refers to a rotary mechanical device that extracts energy from a fluid flow and converts it into useful work. The work produced can be used for generating electrical power when combined with a generator in some embodiments. A turbine is a turbomachine with at least one rotor assembly 76, which can be configured as a shaft or drum with blades 77 attached.

Moving fluid acts on the blades so that they move and impart rotational energy to the rotor.

Figure 6D:
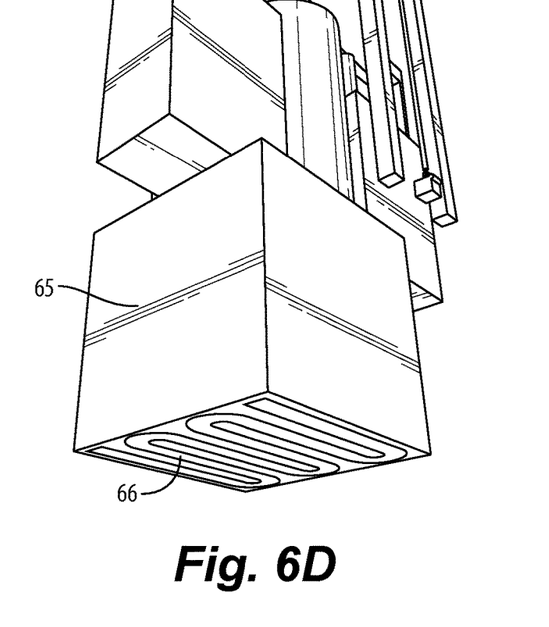
FIG. 6d is a bottom view of a tank comprising one or more heating coils in accordance with some embodiments of the presently disclosed subject matter.

In some embodiments, one or more heating coils 66 can be positioned underneath the tank 65 storing the biodegradable hydraulic oil to keep it from freezing in cold temperatures, as shown in FIG. 6d. The heating coils can include heating elements formed of wire or metal and can be straight, curved, and/or coiled. The coils can be formed from any suitable material, such as nichrome, etched foil, copper/nickel alloys, iron alloys, copper alloys, nickel alloys, chromium alloys, and the like.

Figure 7A:
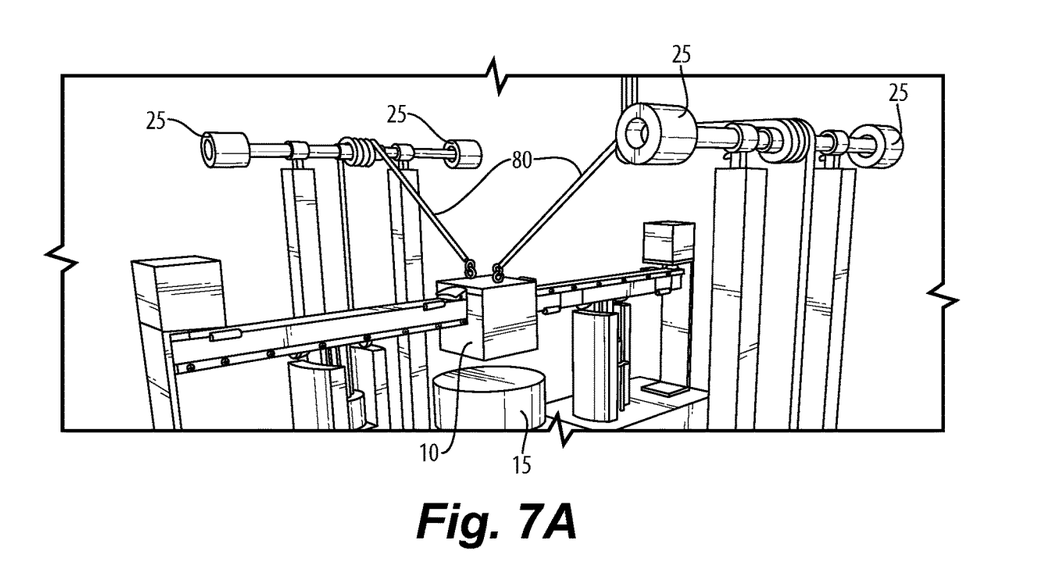
FIG. 7a is a perspective view of a system comprising a cable attached to two weight, one being a main weight and the other a tension weight in accordance with some embodiments of the presently disclosed subject matter.
Figure 7B:
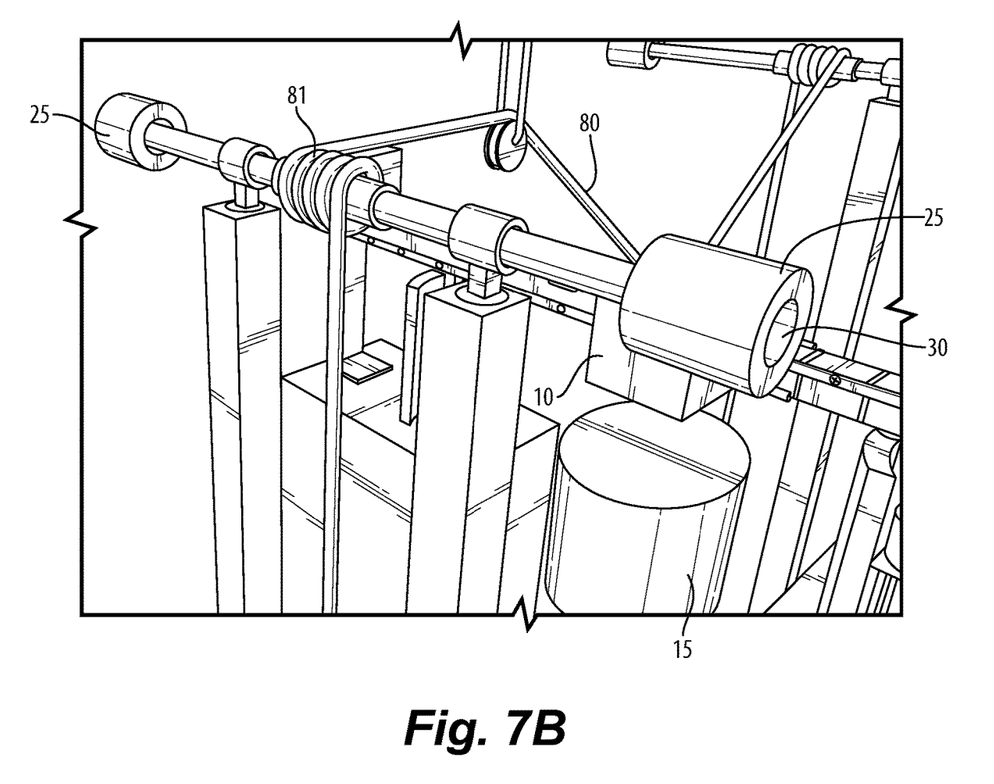
FIG. 7b is a perspective view of a cable comprising a toothed region configured about a spool in accordance with some embodiments of the presently disclosed subject matter.

While the weight is in motion from the first (upper) end of the cylinder to the second end, a pair of toothed cables 80 attached at a top end of weight 10. As the weight drops to the lower end of cylinder 15, the cables are pulled downward with the weight, spinning spools 25, creating electricity in one or more generators 30, as shown in FIGS. 7a and 7b. The term "spool" refers to a device that can hold a cable in a spiral pattern and release the cable in a straight line on demand. The term "generator" refers to a device that converts mechanical energy into electric power. Thus, generators 30 convert the motion of the weight falling (and thereby spinning spools 25) into electric power for use in an external circuit. The generator can include a rotor positioned within a spool and a stationary portion that surrounds the rotor.

Figure 8A:
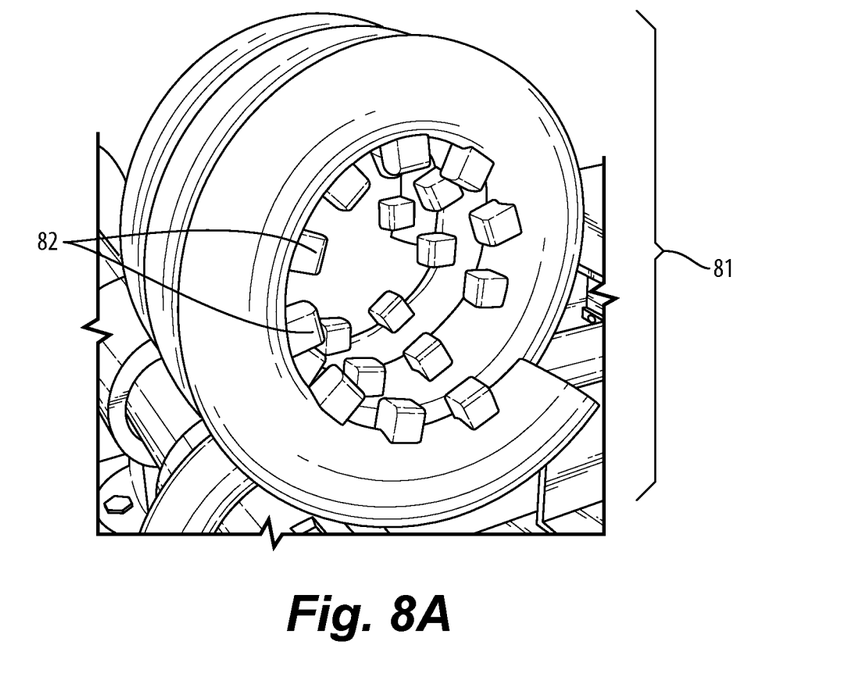
FIG. 8a is a perspective view of the toothed cable region in accordance with some embodiments of the presently disclosed subject matter.
Figure 8B:
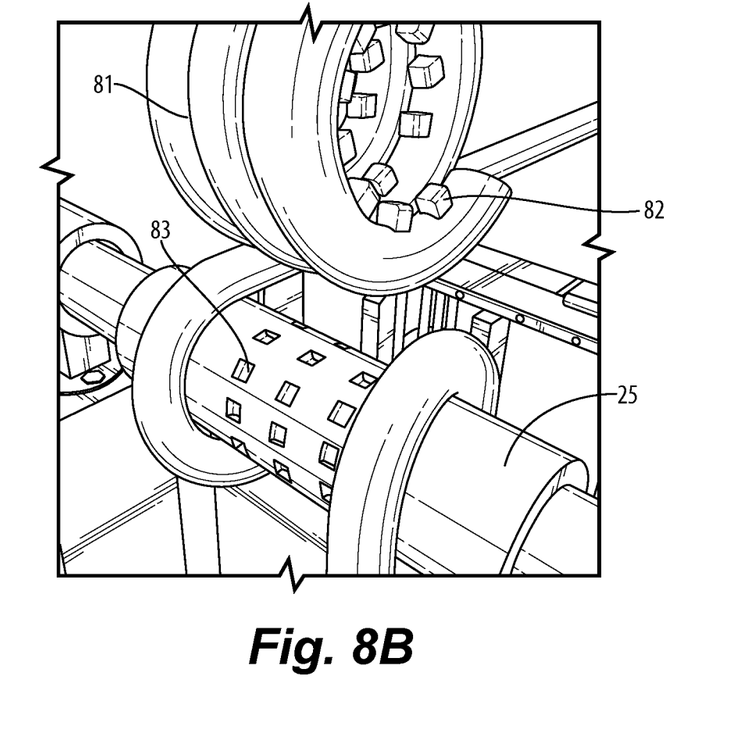
FIG. 8b is a perspective view of a spool comprising a series of cooperating valleys in accordance with some embodiments of the presently disclosed subject matter.
Figure 8C:
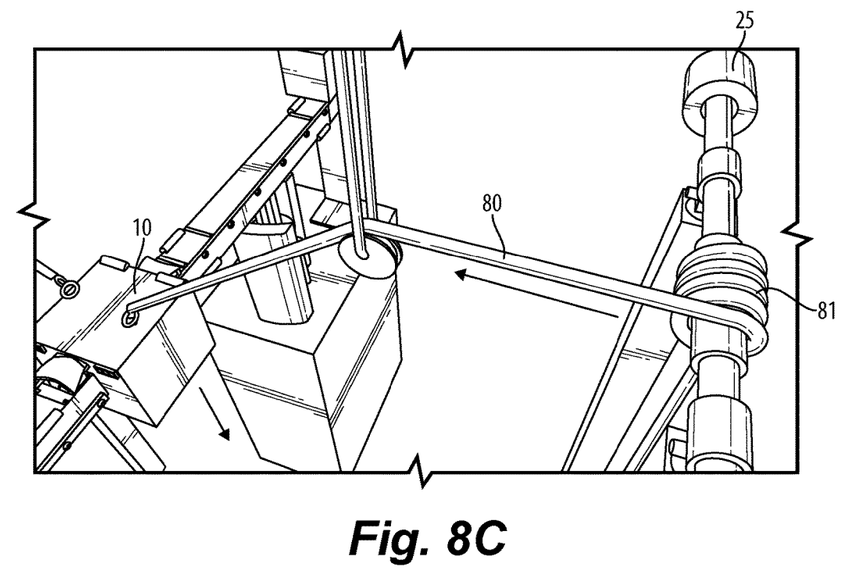
FIG. 8c is a perspective view of the cable and spool as the weight drops in accordance with some embodiments of the presently disclosed subject matter.
Figure 8D:
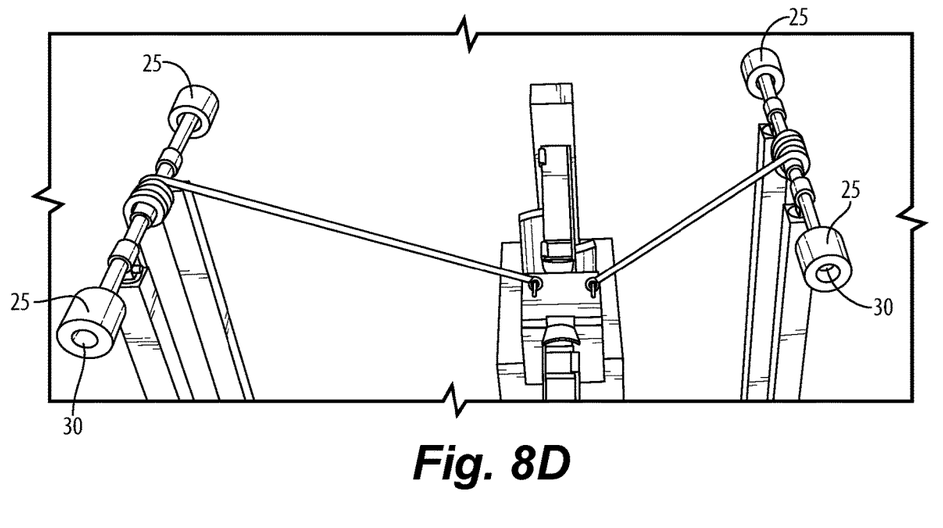
FIG. 8d is a perspective view illustrating a system comprising a plurality of generators in accordance with some embodiments of the presently disclosed subject matter.

Each cable 80 includes toothed region 81 configured around spool 25. FIG. 8a illustrates one embodiment of the toothed region of cable 80 that includes a plurality of teeth 82. Each tooth cooperates with corresponding valley 83 on an exterior surface of the spool, as shown in FIG. 8b. Accordingly, as the weight drops, the cable is also extended from the spool, as shown in FIG. 8c. As the toothed region of the cable is unwound, teeth 82 (each positioned in a corresponding spool valley) turn the spool, acting as a gear that fits in and forces the spool to turn. As the spool turns, the electromagnets of AC generators 30 are turned, as shown in FIG. 8d. Thus, the generator is attached to the spool, such that when the spool is spun as the weight drops, the toothed cable will move off the spool and then be wound back onto the spool when the weight is lifted.

Figure 9A:
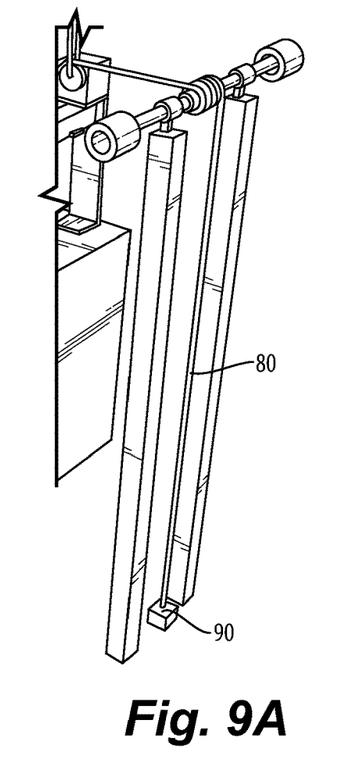
FIG. 9a is a perspective view of a system tension weight in accordance with some embodiments of the presently disclosed subject matter.

Due to varying electrical demand throughout the day, the spinning speed of magnets positioned within generators 30 can be adjusted to maintain a stable electrical frequency. To keep tension on toothed cable 80, tension weight 90 is connected to the opposed end of the cable, as shown in FIG. 9a. Thus, a first end of the toothed cable is attached to weight 10 with the opposed end attached to tension weight 90. The function of the tension weight is to keep tension on the toothed cable and properly position the cable on spool 25 when the hydraulics push the weight up.

The tension weights can be configured with a weight of only a fraction of weight 10. The tension weight functions to keep the toothed cable tightly connected to spool 25 via said tension while providing minimum resistance to weight 10. Thus, each tension weight can have a weight of at least about (or no more than about) 10-150 pounds (e.g., at least/no more than about 10, 15, 20, 25, 30, 35, 40, 45, 50, 55, 60, 65, 70, 75, 80, 85, 90, 95, 100, 105, 110, 115, 120, 125, 130, 135, 140, 145, or 150 pounds). However, any weight can be used.

Figure 9B:
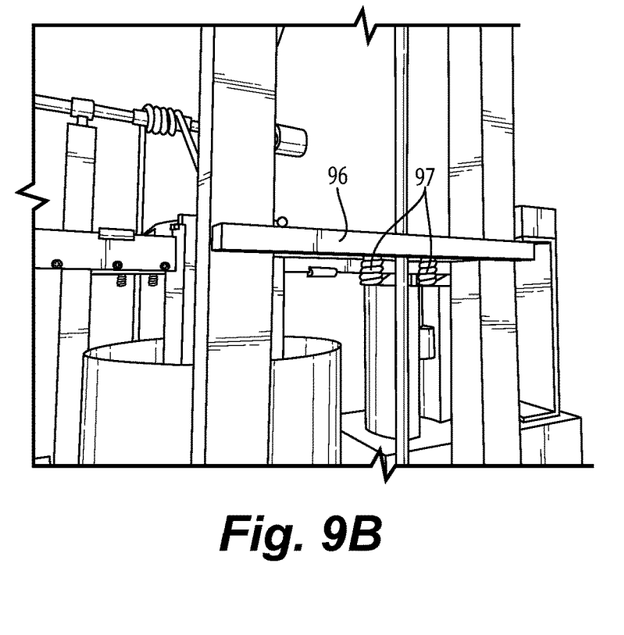
FIGS. 9b and 9c are perspective views of a tension weight spring ceiling in accordance with some embodiments of the presently disclosed subject matter.
Figure 9C:
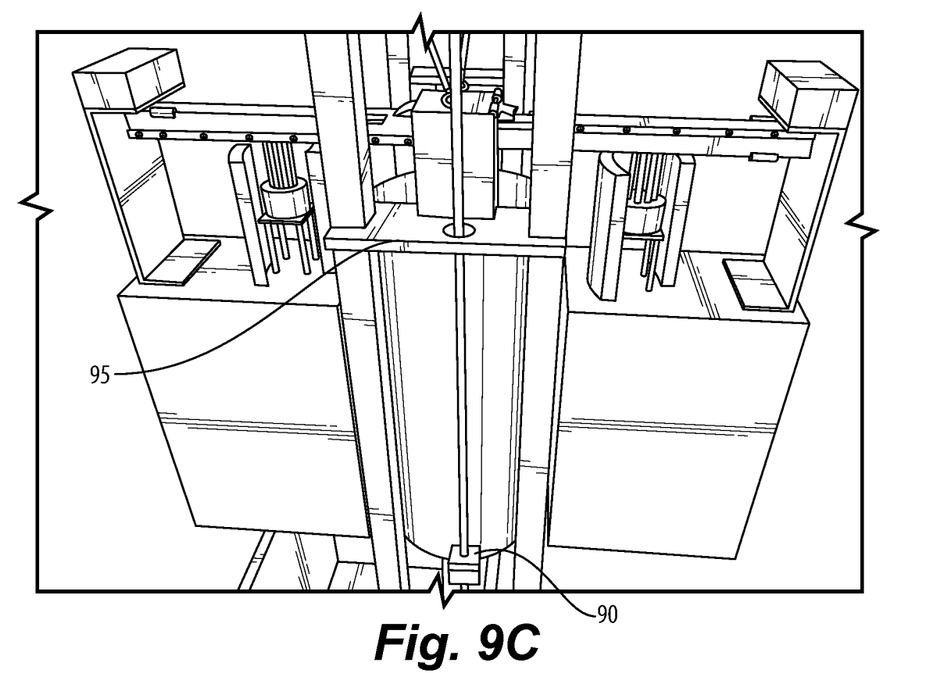

In some embodiments, the system includes spring ceiling 95 to prevent the tension weight 90 disrupting the system when the main weight falls, as shown in FIGS. 9b and 9c. The spring ceiling can include platform 96 with one or more springs 97 positioned on a lower face of the platform.

Figure 10A:
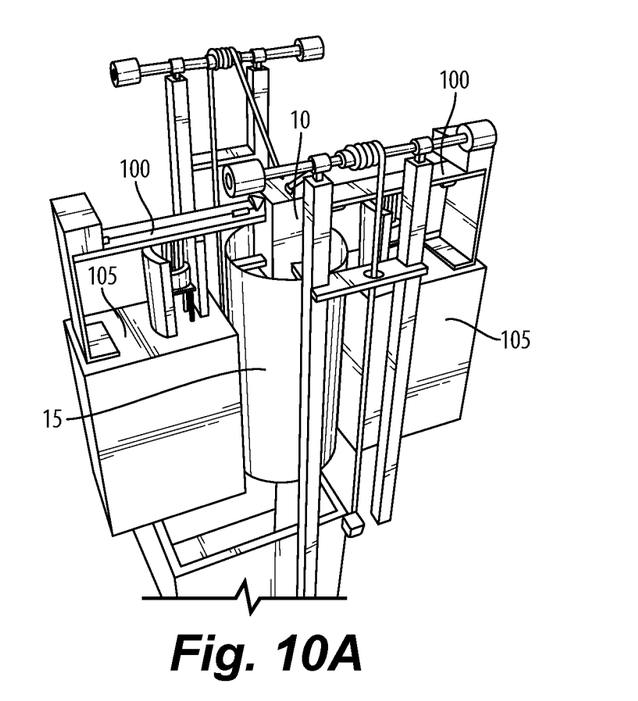
FIG. 10a is a perspective view of a system comprising a pair of catching rods in accordance with some embodiments of the presently disclosed subject matter.
Figure 10B:
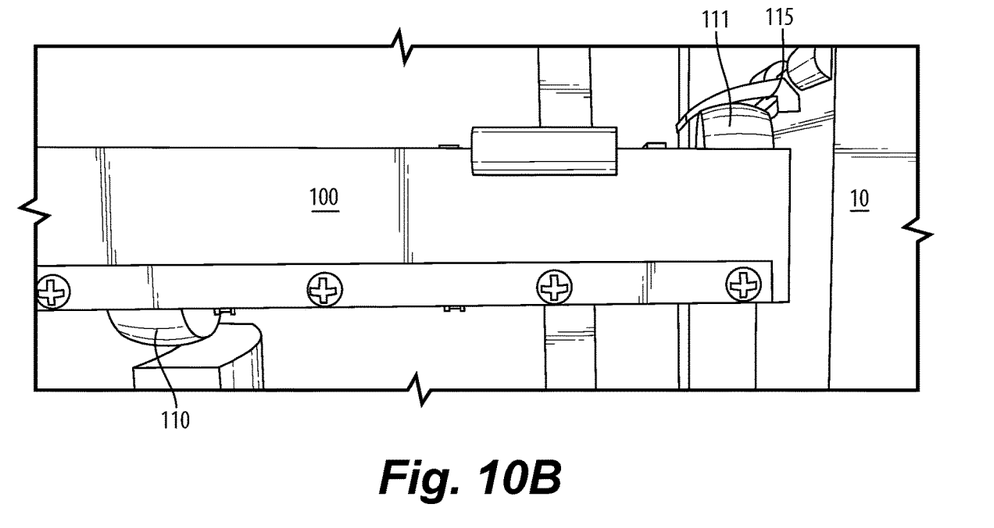
FIG. 10b is a perspective view of a catching rod comprising upper and lower wheels in accordance with some embodiments of the presently disclosed subject matter.

When a user desires to drop weight 10 from the first, upper end of cylinder 15 to the second, lower end and onto piston 55, an electric motor can be used. For example, an electric motor can cooperate with catching rods 100 to release weight 10, as illustrated in FIG. 10a. The term "electric motor" refers to a device that converts an electrical signal into physical movement, such as a motor that rotates in response to electrical energy. The term "catching rod" refers to any element that can support weight 10 between the top and bottom ends of cylinder 15. Particularly, the electric motor turns catching rods 100 positioned around the hydraulic cylinder. Each catching rod is positioned on table 105 that includes upper and lower wheels 110, 111. The lower wheels support the catching rods to keep them off the ground (and prevent the electric motor underneath it from being damaged). The top wheels push against weight 10 as shown in FIG. 10b. Handles 115 are attached to the sides of the main weight and make contact with the wheels when the catching rod is rotated under the handles.

Figure 10C:
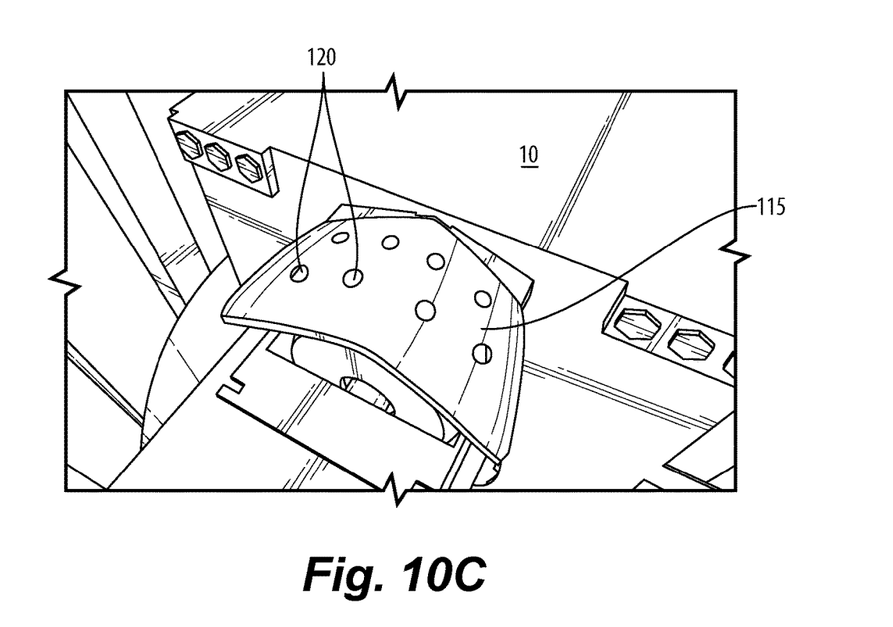
FIG. 10c is a perspective view of a wheel handle in accordance with some embodiments of the presently disclosed subject matter.

In some embodiments, the wheel handles can include one or more holes 120 to improve aerodynamics, as shown in FIG. 10c. However, the holes are optional features.

For catching rod 100 to support weight 10, one or more counterweights 125 can be provided on the opposed side of the catching rod. The counterweights can have any desired weight, such as (but not limited to) about 50-300 pounds. Thus, each counterweight can have a weight of at least about (or no more than about) 50, 75, 100, 125, 150, 175, 200, 225, 250, 275, or 300 pounds. However, the counterweights can be configured with a weight that is greater or less than the range given above. It should be appreciated that tension weights 90 are offset from the counterweights. Accordingly, they do not contact each other and interfere with the system.

Figure 11:
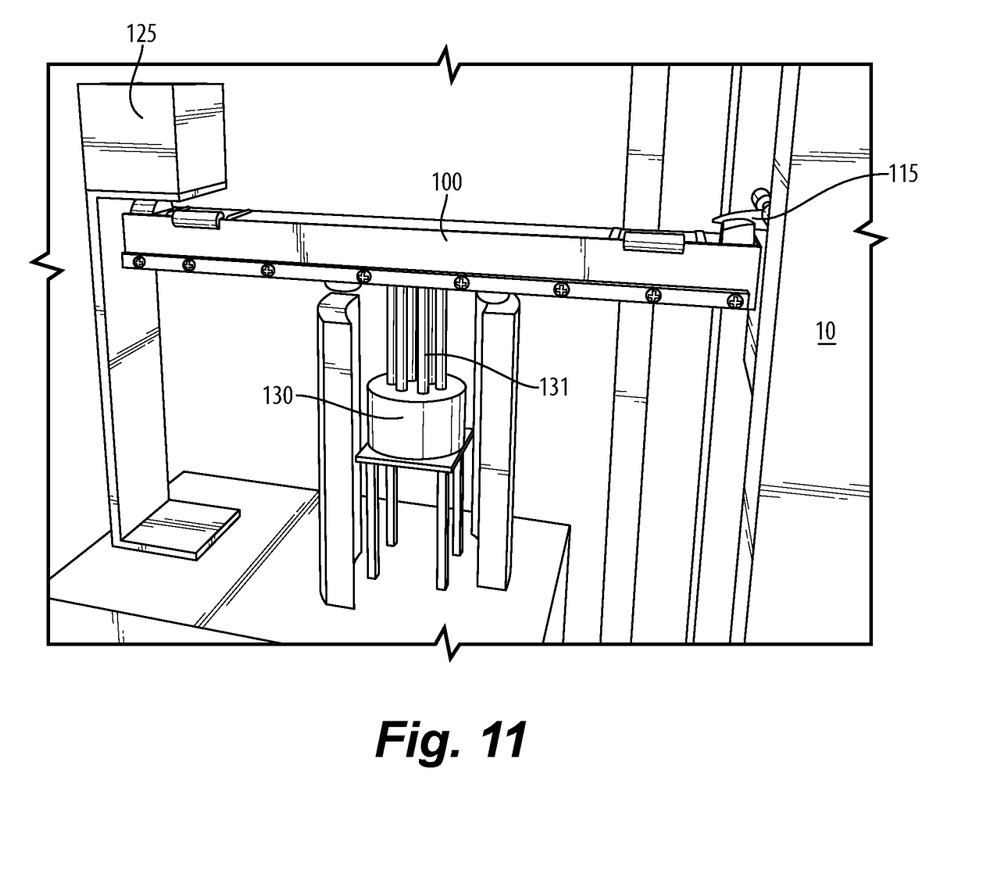
FIG. 11 is a perspective view of a catching rod and a motor that adjusts the position of the catching rod in accordance with some embodiments of the presently disclosed subject matter.

When weight 10 has reached the top end of cylinder 15, motor 130 rotates the catching rods and supports the weight by sitting under wheel handle 115, as shown in FIG. 11. Each motor can include a series of poles 131 that push the catching rods. The wheel handle is attached to weight 10. Thus, as the motor turns the catching rods and the wheel handles are released, weight 10 is no longer supported by the catching rods and the weight drops to rest on piston 55. The distance the weight drops could be either 10, 20, or 30 ft (with matching heights for the hydraulic cylinder).

The catching rods can rotate about 90 degrees in some embodiments. However, the presently disclosed subject matter is not limited and the catching rods can rotate any desired amount so long as it rotates away from weight 10 at a desired time, allowing it to fall to the cylinder piston.

In some embodiments, system 5 can include multiple weights 10 that can be used to increase energy output. For example, during low demand hours, two weights may be able to power a town. When demand doubles during higher peak times, four or more weights can be used. Each weight can be configured with its own landing block and related system. In this way, system 5 can be scaled to meet a variety of energy demands, such as high peak times, low peak times, large urban areas, medium sized cities, and smaller rural towns.

When catching rods 100 are in use, a supporting table can support the catching rod from underneath. The gravitational hydraulic cylinder uses the power of hydraulics to multiply its energy, lifting weight 10 to the raised position, and the catching rods will maintain the weight in place until the user desires to drop the weight again. When weight 10 is dropped, it powers a plurality of generators 30 that transfer energy to a pumped water system that is better at matching consumer demand.

Optionally, system 5 can include solar power to offset potential efficiency losses.

Exemplary embodiments of the methods and components of the presently disclosed subject matter have been described herein. As noted elsewhere, these embodiments have been described for illustrative purposes only, and are not limiting. Other embodiments are possible and are covered by the presently disclosed subject matter. Such embodiments will be apparent to persons skilled in the relevant art(s) based on the teachings contained herein. Thus, the breadth and scope of the present invention should not be limited by any of the above-described exemplary embodiments but should be defined only in accordance with the following claims and their equivalents.

What is claimed is:

1. A system comprising:
a main weight comprising one or more arms that extend outwardly from a front face, rear face, side face, or combinations thereof;
a hydraulic cylinder comprising an upper first end, a lower second end, a length between the upper and lower ends, and a diameter configured to accommodate a hydraulic piston configured to travel along an interior of the hydraulic cylinder, wherein the hydraulic cylinder contacts one end of each arm and wherein the hydraulic piston is configured to raise the main weight from the lower second end of the hydraulic cylinder to the upper first end of the hydraulic cylinder;
a pair of cables, each comprising a first end attached to the main weight, wherein each cable includes a toothed region that cooperates with a spool that includes an electromagnet positioned at each end;
a pair of rotatable catching rods with one end positioned adjacent to the main weight, and a pair of upper wheels and a pair of lower wheels, wherein the catching rods support the main weight in a first position and in a second position release the main weight.

2. The system of claim 1, wherein the main weight has a weight of about 400-700 pounds.

3. The system of claim 1, wherein the hydraulic cylinder has a height of about 10 to 30 feet.

4. The system of claim 1, wherein the hydraulic cylinder is vertical in orientation.

5. The system of claim 1, further comprising a tension weight positioned at a second end of each cable.

6. The system of claim 5, wherein the system includes a spring ceiling in communication with the tension weight, the spring ceiling defined by a platform and a plurality of springs.

7. The system of claim 1, further comprising a motor defined by a series of poles that move the catching rods.

8. The system of claim 1, wherein the catching rods are supported by a table.

9. The system of claim 1, wherein the catching rods comprise a plurality of counterweights.

10. The system of claim 9, wherein the counterweights have a weight of about 50-300 pounds each.

11. The system of claim 1, wherein the catching rods are configured to rotate about 90 degrees.

12. The system of claim 1, wherein the hydraulic cylinder includes an exterior polyurethane foam covering.

13. The system of claim 1, wherein the hydraulic cylinder is activated by an electric water pump.

14. The system of claim 5, wherein the tension weight has a weight of about 10-150 pounds.

15. A method of generating gravitational energy with the system of claim 1, the method comprising:
dropping the main weight from the upper first end of the hydraulic cylinder to the lower second end to generate energy;
initiating the hydraulic cylinder piston to push the main weight from the lower second end of the hydraulic cylinder to the upper first end of the hydraulic cylinder;
wherein electric generators are powered by dropping the main weight; and
wherein gravitational energy is generated.

16. The method of claim 15, wherein the main weight has a weight of about 400-700 pounds.

17. The method of claim 15, wherein the main weight is dropped a distance of about 10-30 feet.

18. The method of claim 15, wherein the hydraulic cylinder is vertical in orientation.

19. The method of claim 15, wherein the catching rods are configured to rotate about 90 degrees.

20. The method of claim 15, wherein the hydraulic cylinder is activated by an electric water pump.

* * * * *